United States Patent [19]

Eimer et al.

[11] Patent Number: 4,904,397
[45] Date of Patent: Feb. 27, 1990

[54] DEVICE FOR THE MECHANICAL CLEANSING OF FLUIDS

[75] Inventors: Klaus Eimer, Ratingen; Hans-Werner Schildmann, Heiligenhaus; Detlef Taprogge, Wetter Ruhr; Klaus-Michael Bitzer, Moers; Dieter Patzig, Ratingen, all of Fed. Rep. of Germany

[73] Assignee: Taprogge Gesellschaft mbH, Wetter, Fed. Rep. of Germany

[21] Appl. No.: 126,029

[22] Filed: Nov. 27, 1987

[30] Foreign Application Priority Data

Nov. 28, 1986 [DE] Fed. Rep. of Germany ....... 3640638
Aug. 21, 1987 [EP] European Pat. Off. .......... 87112162

[51] Int. Cl.⁴ ............................................. B01D 29/38
[52] U.S. Cl. ................... 210/791; 210/333.1;
    210/354; 210/411; 210/415; 210/414
[58] Field of Search ............... 210/791, 131, 137, 138,
    210/333.1, 354, 411, 413, 415, 445, 408, 414,
    107, 435, 130; 55/284, 302

[56] References Cited

U.S. PATENT DOCUMENTS

| 1,585,817 | 5/1926 | Bailey et al. | 210/411 |
| 2,310,587 | 2/1943 | MacNeill | 210/411 |
| 3,256,995 | 6/1966 | Schmid et al. | 210/411 |
| 4,486,304 | 12/1984 | Neuman et al. | 210/333.1 |
| 4,582,603 | 4/1986 | Nasse | 210/333.1 |

FOREIGN PATENT DOCUMENTS 3419698 1/1986 Fed. Rep. of Germany .

OTHER PUBLICATIONS

"Taprogge Filter Type BWR-1", brochure No. 8501-2-2-410-02.

Primary Examiner—Richard V. Fisher
Assistant Examiner—Coreen Y. Lee
Attorney, Agent, or Firm—Herbert L. Lerner; Laurence A. Greenberg

[57] ABSTRACT

In the cleansing especially of cooling water for a heat exchanger the installation of rotationally symmetric filter bodies in the cooling water feeder pipe and suction of sediments across a suction nozzle rotating on the windward side. Difficulties result therein in the production of a required back-flow through the filter and the avoidance of lateral airfluxes in front of the filter surface, as a certain gap is necessary between filter and suction nozzle for holding the sediments. In order to guarantee problem-free suction it is provided according to the invention that the windward filter surface (2) is subdivided into individual sectors (14) by radial ridges (13) projecting against the direction of flow, whose central angle corresponds maximally to that of the nozzle (6) of the suction device also in the shape of a sector and that the gap between the free ridge edges (13) and the edges of the nozzle (6) circulating at a distance from the ridge edges is bridged by flexible sealing lips of at least the width of the gap.

11 Claims, 6 Drawing Sheets

DEVICE FOR THE MECHANICAL CLEANSING OF FLUIDS

BACKGROUND OF THE INVENTION

1. Field of the Invention

The invention relates to a device for the mechanical cleansing of fluids, especially of a cooling water to be supplied to a heat exchanger, with a rotationally symmetrical filter body arranged within the cooling water feeding pipe and a suction device on the same axis partially acting upon the windward filter surface, and, which is rotatably arranged in such a manner that it crosses the complete filter surface.

2. Description of the Related Art

A device of this kind is known for example from DE-PS 33 47 064 and DE-OS 34 19 698. The suction device consists therein usually of a slot-shaped radially running nozzle, which is rotationally driven and which crosses the inner surface of the filter and is connected to a suction pipe leading outwards. In order to remove deposits on the filter windward of the cool water flow, diminished pressure is produced therein in the suction nozzle by the connection of the suction pipe to a space at low pressure, by which means a back-flow from the outside of the filter is produced in each region of the filter surface to be cleansed, with which the impurities are to be carried away. This back-flow through the filter from the outside to the inside takes place however only if the edges of the suction nozzle are led along the filter surface with a relatively small gap. The suction nozzle is therefore usually provided with flexible sealing lips, which slide along the filter surface. However, the danger exists that deposits of greater volume, such as stones or pieces of wood, are not gripped by the nozzle but are pushed on the filter surface in front of the nozzle. It is therefore customary to form the foward sealing lip of the nozzle somemat smaller in the direction of rotation and with a gap from the filter surface and simply to allow the rear sealing lip to slide along the filter surface. By this means, larger sediments on the filter surface are picked up by the nozzle; yet, a considerable amount of cooling water windward of the filter body streams sideways into the nozzle, so that the desired back-flow through the filter body is itself strongly reduced or completely cancelled, so that the suction effect is considerably reduced. Attempts have been made to reduce this disadvantage by arranging a spray nozzle rotating with the suction nozzle on the leeward side of the filter body, which yields the desired back-flow. Such an additional arrangement is however, very expensive and of limited effect.

SUMMARY OF THE INVENTION

The object of the present invention is therefore to produce an arrangement by which means a problem-free back-flow without sizeable leakage currents, and thereby a secure cleaning of the windward filter surface even of coarser impurities, can be safely guaranteed.

For the solution of this problem there is provided according to the invention that the windward filter surface is sub-divided into individual sectors by radial ridges projecting against the direction of flow, whose central angle corresponds approximately to that of the nozzle of the suction device, also in the shape of a sector, and that the gap between the free ridge edges and the edges of the nozzle circulating at a distance from the ridge edges is bridged by flexible sealing lips of at least the width of the gap.

Sector-shaped spaces are thus created on the filter surface by these ridges, whose height at least matches that of the largest deposits to be expected. By the arrangement of sealing lips between the suction nozzle and these ridges, which completely bridge over the gap, each sector held by the nozzle is clearly sealed off at the side, so that a clear back-flow can develop through the filter and the deposits are securely carried off.

The sealing lips can therein be attached to the ridges placed on the filter surface or on the radial side walls of the suction nozzle.

Furthermore, it is advantageous if the suction nozzle also comprises sealing lips at the inner and outer circumference, in order thus to seal off the individual sectors in all directions.

In a conical embodiment of the filter body, the affixed ridges usually run along generating lines of the inner filter surface. However, it is also possible that the inner space of the conical filter body is sub-divided by radial parting walls into individual sector-shaped chambers, and the front-side free ends of the parting walls are provided with sealing lips.

A further advantage is gained if the ridges with a circulating ring lying radially outwards form a rigid bearing frame, in whose sectors individual filter bodies are inserted and mounted. A high characteristic stiffness of the actual filter body is thereby guaranteed even at large pipe line diameters.

The filters can however, also consist of two-dimensional arched segments, which run out approximately radially and horizontally from the central axis and extend approximately tangentially right up to the inner circumference of the circulating ring. It is useful therein if the filter segments are braced by means of plates fixed above and below them to the ridges in such a manner that the plates provide a contour at the point of bracing corresponding to that of the filter arching.

In such an embodiment, further, one or several of the filter segments are formed as excess pressure flaps in such a manner that they are swivel-mounted in the direction of flow across an axis running at a slant to their radial extension in the region of their outer edge.

For the improvement of the running off of the water, the ridge walls can therein comprise overflow orifices for the water at excess pressure on both sides of a filter segment developed as a raised pressure flap.

A further constructional possibility consists in that a truncated-conical frame construction is formed by ridges and circulating rings upon which corresponding conical shell-shaped surfaces and a front-side plane filter surface are installed. This plane filter surface with associated frame parts can be extendable as a by-pass flap across a drive.

For the especially space-saving installation of a filter device a construction is further possible in which the edges of the radial ridges run windward and leeward according to cone generating lines and that the filter construction together with the windward suction device and its drive arranged leeward of the filter ridges are arranged completely within the pipe main forming the water chamber of the condenser.

The fixed part of the suction pipe can be arranged axially-radially in a flange pipe section in front of the water chamber and through-putting the water chamber outwards.

BRIEF DESCRIPTION OF THE DRAWING

The construction and manner of functioning of examples of embodiments according to the invention are described in greater detail by means of a schematic drawing, in which.

DESCRIPTION OF THE PREFERRED EMBODIMENTS

Figure 1:
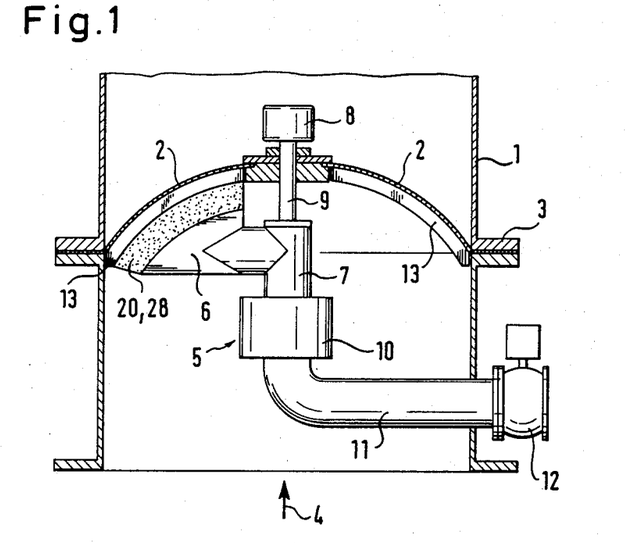
FIG. 1 shows a longitudinal section through a pipeline with filter body and suction device inserted.

As will be seen from FIG. 1, a two-dimensionally dome-shaped filter body 2 is installed in a cooling water pipeline for example of a heat exchanger or of the condenser of a power station, which filter body is braced within a flange 3 of the pipe line 1. The cooling water stream infiltrates the pipe line 1 in the direction of the arrow 4 in the process. Windward of the filter body 2, a suction device 5 is arranged with a suction nozzle 6 placed opposite the filter body 2, which nozzle is connected with a connecting piece 7 co-axial with the pipe line 1 and rotationally driven across a motor 8 leeward of the filter body 2 and a shaft 9. Throughout the specification, the word "windward" is understood to mean "upstream" and the word "leeward" is understood to mean "downstream". Within a coupling piece 10 connected to the pipe connecting piece 7 the suction connecting piece 7 turns into a fixed curved pipe 11, which goes radially outwards through the pipe line wall 1 and is connected to a (not represented) suction main across a slide valve 12.

As may be seen from the view from below of the filter body 2 corresponding to FIG. 2 and the section through the development of the filter surface according to FIG. 3 and magnified in scale, radial ridges 13 projecting against the direction of flow are arranged windward of the filter body, sub-dividing the filter surface 2 into individual sectors 14 of equal size. The suction nozzle 6 is formed as-a sector in an identical manner, wherein both of the radial side walls 15 and 16 of the nozzle 6 include at least the same central angle to each other as the ridges 13. The active surface of the suction nozzle 6 thereby always covers at least one sector 14 between the ridges 13, in the appropriate position.

Figure 3:
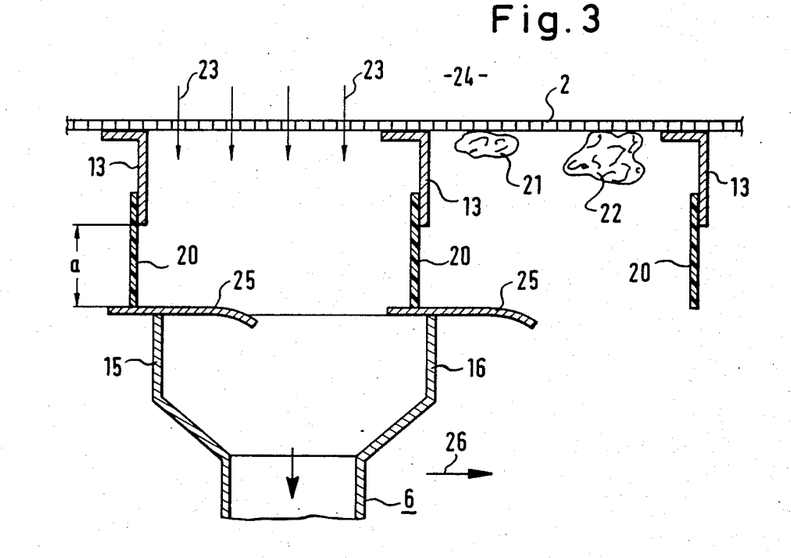
FIG. 3 shows a partial longitudinal section through the filter surface in developed view and the suction nozzle with sealing lips attached to the ridges.

As may be seen especially from FIG. 3, the side walls 15 and 16 of the suction nozzles 6 end at a distance in front of the ridges 13 and thereby leave a gap "a" free. This gap "a" is bridged according to the example of embodiment represented in FIG. 3 by means of flexible sealing lips 20, which are fastened to the ridges 13 and comprise at least the free length of the gap "a".

The principal manner of functioning of this device is henceforth as follows. After a certain period of running, deposits will have sedimented windward of the filter body 2, represented for example in FIG. 3 as stones 21 and 22, each lying within a sector 14 between two ridges 13. If the suction nozzle 6 now travels over such a sector 14, which is laterally sealed off by way of the flexible sealing lips 20, a backflow 23 results from the action of the suction pipe through the filter body 2 from the leeward side 24 of the filter body 2 back into a sector 14 and from there into the suction nozzle 6, wherein any deposits adhering to the filter body 2 are removed with this back-flow 23 and led out through the suction nozzle 6. Because of the lateral elastic sealing off of each sector 14 through the elastic sealing lips 20, no cross-current from windward of the filter body 2 can occur, but there is usually a clear back-flow 23, which helps the problem-free removal of deposit.

As may be seen from FIG. 3, it can useful in this process to provide plates 25 at the front edges of the lateral walls 15 and 16 of the suction nozzle 6 across these side walls, in order to guarantee a problem free sliding of the sealing lips 20 onto the suction nozzle 6 during a rotation in the direction of the arrow 26. The plates 25 are particularly necessary if the suction nozzle 6 is continuously moved, as the sector 14 is otherwise only isolated for a very short period of time to yield a sufficient back-flow. The plates 25 can however be dispensed with if the suction nozzle 6, after travelling to a sector 14, remains there for a certain period of time.

Figure 4:
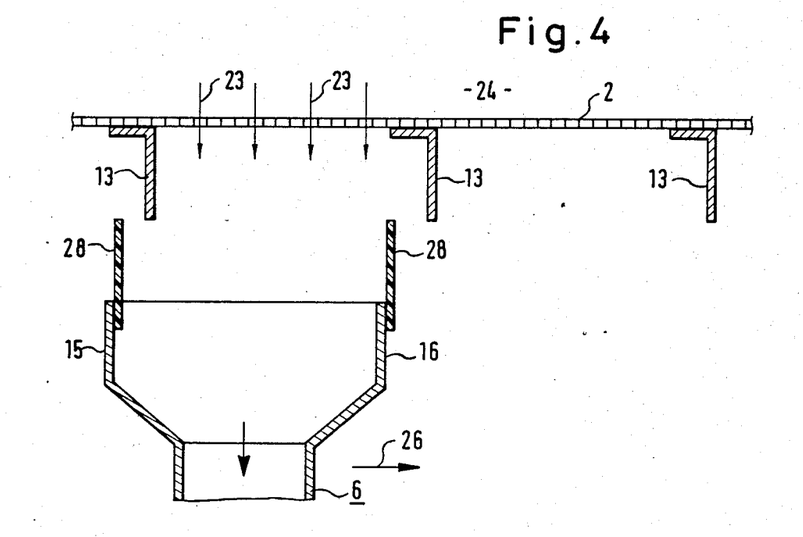
FIG. 4 shows a partial section corresponding to FIG. 3 with sealing lips attached to the suction nozzle.

As may be seen from the representation from FIG. 4, it is also possible however to attach the sealing lips 28 not to the ridges 13 but to the sides 15 and 16 of the suction nozzle 6, by which means the same effect is achieved as in the example of embodiment according to FIG. 3.

Figure 5:
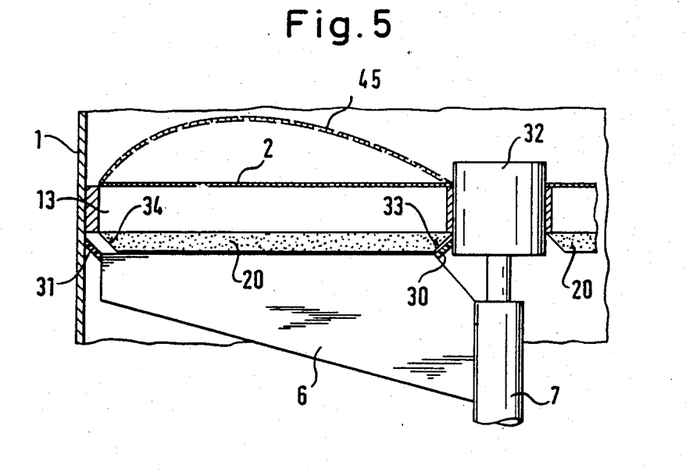
FIG. 5 shows a radial section through a ridge and suction nozzle with circumferential sealing lips.

In order further to prevent also cross-currents windward of the filter body at the edges of the suction nozzle 6 lying radially inside and outside, an elastic sealing lip 30 is provided radially inside at the suction .nozzle 6 and a sealing lip 31 is provided radially outside according to the radial section according to FIG. 5, sliding along the corresponding opposing surfaces, such as for example the inside of the pipe line 1 or the cylindrical insert 32 for the drive of the suction nozzle 6. It is useful in this process if the sealing lips 20, which are fastened to the ridges 13 in the example of embodiment here represented, are provided at their ends with sloping edges 33 and 34.

It would however, also be equally possible to arrange both kinds of sealing lips 20, or 30 and 31, together at the ridges 13 or at the suction nozzle 6.

Figure 6:
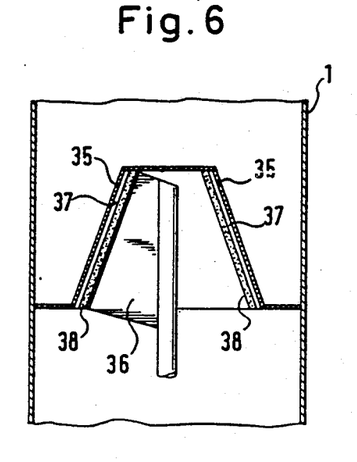
FIG. 6 shows a filter body of conical shape with ridges placed upon it.

Moving away from the examples of embodiment according to FIGS. 1 to 4 in which the filter body 2 is dome-shaped or flat, a conical or truncated-conical filter 35 can also be installed in the pipeline 1 according to FIG. 6. The suction nozzle 36, which circulates in the interior of the filter body 35, must then be shaped according to the drawings. In such an embodiment of the filter body 35, ridges 37 can then be arranged along generating lines on the inside of the filter body 35 and provided with corresponding sealing lips 38. Cleaning out occurs in the same manner as represented in connection with the example of embodiment according to FIG. 3.

Figure 7:
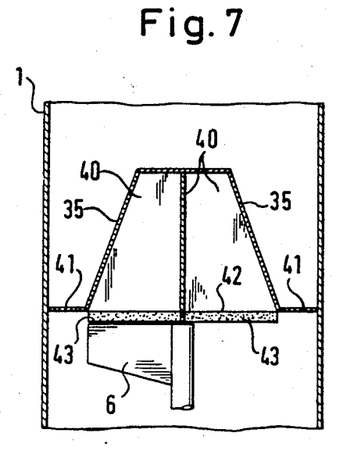
FIG. 7 shows a longitudinal section through a conical filter with radial parting walls.

It is however also possible corresponding to the representation in FIG. 7 to sub-divide the interior space by radial parting walls 40, which extend from the central axis to the inner side of the filter, into individual sector-shaped chambers, in the case of a conical filter body 35. These parting walls 40 then smoothly lock off with the fastening flange 41 and are provided with corresponding sealing lips 43, which engage with the side walls under appropriate rotation of the suction nozzles 6, at their free front edge 42.

Figure 2:
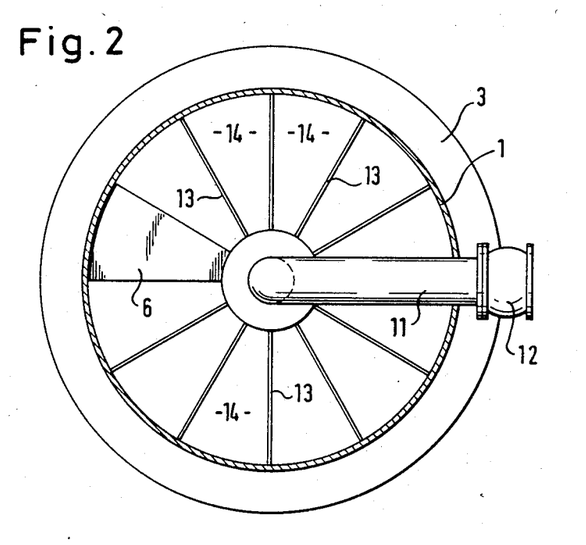
FIG. 2 shows a cross-section through this pipe main with a view of the windward filter surface with suction device.
Figure 8:
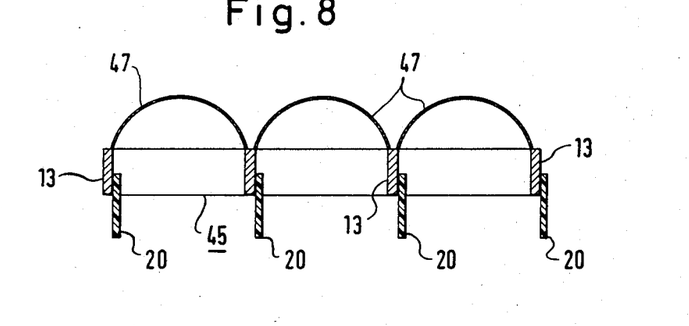
FIG. 8 shows a filter body with individual strainer baskets and bearing frame formed through the ridges.

A particularly advantageous and stable formation of the filter body, especially with very large pipe line diameters, results corresponding to the example of embodiment according to FIG. 8, if the ridges 13 are united by a radial exterior circulating ring 45 and an interior ring not represented in detail into a rigid frame, which from a top view results in a bearing body, roughly wheel-shaped in appearance, of the arrangement represented in FIG. 2. Deep, arched individual filter bodies 47 can then be inserted into the individual sectors between the ridges 13 and the ring 45, which are identically arched in a radial direction (see also the broken-line contour 47 in FIG. 5) and comprises a roughly trapeze-shaped outer circumference. With a shape of this kind, not only do the individual filter surfaces 47, but the whole filter body has an increased solidity due to the stiff bearing frame, which is of great significance in cooling water pipe lines of up to 4 meters diameter, as are required in a large power station, if only to withstand the high water pressures arising. Here too, radial sealing lips 20 are then attached to the ridges 13 according to the example of embodiment according to FIG. 3.

Figure 9:
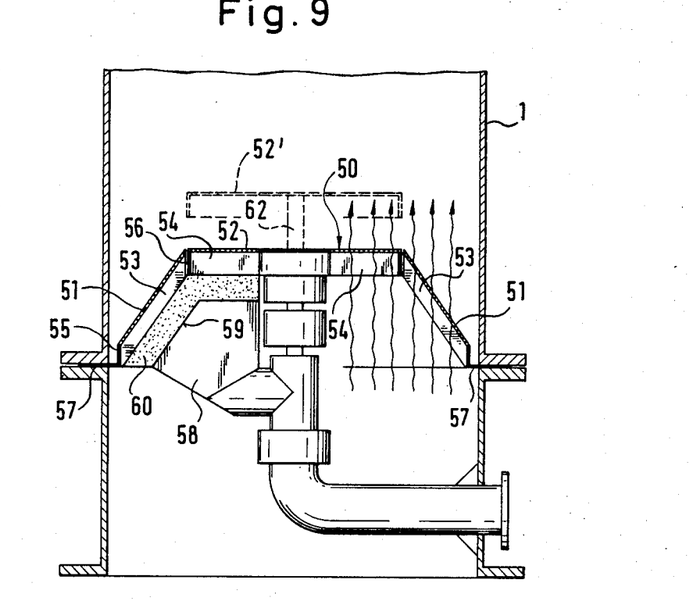
FIG. 9 shows a longitudinal section through a truncated-cone-shaped filter with a filter surface acting as a by-pass flap.

The use of this constructional principle according to FIG. 8 is represented in a further example of embodiment according to FIG. 9 with a truncated-conical filter 50. This filter 50 comprises a conical envelope-shaped region 51 and a front-side plain region 52 of roughly half the diameter of the pipe line 1. The corresponding filter surfaces 51 and 52 are assembled therein on corresponding radial ridges 53 and 54 between corresponding rings 55 and 56, which together form a rigid frame and are fixed across a flange 57 in the pipe line 1. The suction nozzle 58 of corresponding angled exterior contour 59 carries herein the sealing lips 60 according to the invention.

A particular advantage of this design of the filter body 50 is that the horizontal filter surface 52, together with the associated frame parts 54 and 56, can be used as a by-pass flap and if necessary travel axially, so that it then takes up the position 52' indicated by broken lines. Automatic opening of the by-pass flap by means of a shearing pin 62 is also possible.

Figure 10:
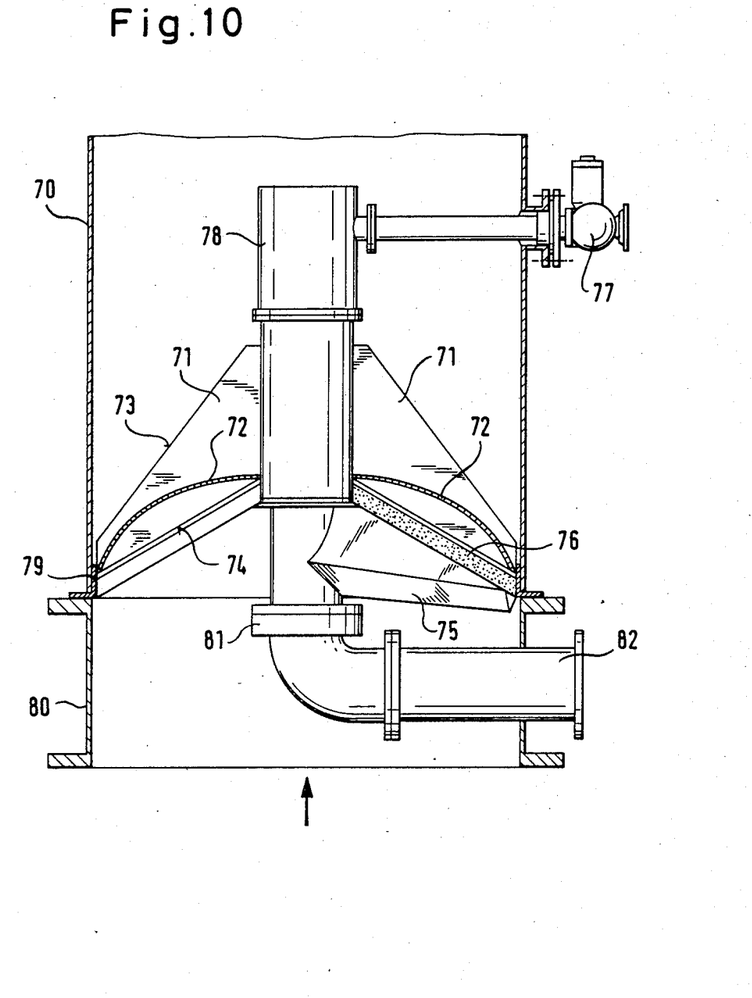
FIG. 10 shows a longitudinal section through a pipe main with a further variant of the filter body.

A further, particularly stable filter device, which in addition requires little separate space within the pipe line or condenser system present, is represented in FIG. 10. The individual ridges 71 within a pipe line section 70, between which the filter segments 72 are arranged, are so developed and arranged therein that they virtually form a conical shell, as the ridge edges 73 run along the leeward side and the ridge edges 74 run along the windward side according to conegenerating lines. By this means, the rotating suction device 75 with the sealing lips 76 can be housed on the windward side completely within the cone formed by the windward edges 74, so that practically no additional space is required for the suction device 75 in an axial direction. Simultaneously the drive 77 for the rotating suction device 75 is placed on the leeward side and drives the suction device 75 for example across an angular gear 78.

The filter segments 72 arranged between the individual ridges 71 consist in this instance usually of two-dimensionally arched filter plates, which extend from the central axis approximately radially and horizontally and approximately tangentially to the interior perimeter of the circulating retaining ring 79.

This filtering device can now be installed with great economy of space completely within e.g. the water chamber 70 of the condenser, not represented in detail, or a pipe line that is present. A short pipe connecting piece 80 is usually required as an additional axial space from which the fixed suction pipe line 82, connected across a rotating seal 81 to the suction device 75, leads out laterally.

Figure 11:
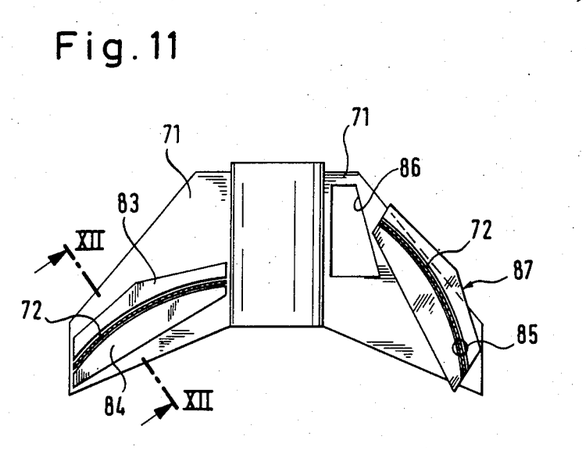
FIG. 11 shows a section through the filter surfaces and a filter surface developed as a by-pass flap.
Figure 12:
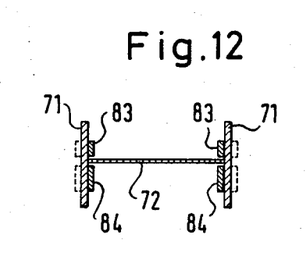
FIG. 12 shows a cross-section through a filter segment with mounting corresponding to the section line XII—XII according to FIG. 11.

In FIGS. 11 and 12, the possibility of a simple mounting of the filter segments 72 according to FIG. 10 is explained. Above and below these filter segments 72, narrow sheet metal plates 83 and 84 are arranged therein laterally at the ridges 71, which are cut out at their edges facing the filter 72 and in correspondence with the vaulting of these filters 72. Each filter 72 is thereby mounted on both sides between two correspondingly cut plates 83 and 84, by which means a simple and secure possibility of fastening results, which also enables a simple exchange of the filters.

The embodiment of such a filter plate 72 as a swivelling by-pass flap is shown in the right half of FIG. 11. According to this, the filter 72 with the bearing plates 83 and 84 is developed as a swivelling unit 87 and mounted to swivel upwards across an axis 85 running across two segments 72, wherein the open position is shown in the diagram. In order to be able to carry off faster the water at raised pressure actuating the opening of the by-pass flap, overflow openings 86 are provided in the neighboring ridges 71 on each side of the by-pass flap above the closed filter position, through which the water can flow out laterally into the relevant neighboring sector.

As will be seen from the foregoing explanations of the individual examples of embodiment, the invention is applicable to filter bodies of every geometrical shape, i.e. the filter body can be formed as flat plane sheet metal, as a dome-shaped section, as a cone or as a truncated cone or as a cylindrical envelope, wherein it is possible in each case to affix the sealing lips either to the ridges or to the suction nozzle itself. Essential for the manner of functioning is a sufficient covering of the individual sectors to be evacuated through the suction nozzle. As the build up of a back-flow into the individual sectors and thus a secure removal of the deposit requires a certain amount of time, it is useful if the suction nozzle does not rotate in continuous circulation, but rather comes against one sector exactly in a discontinuous manner and remains there for a certain period of time, until a complete evacuation of deposits according to the usual quantities given by experience has been achieved.

We claim:

1. Device for the mechanical cleansing of fluids in a cooling water feeding pipe, comprising a rotationally symmetric filter body disposed in and extending over the entire cross section of a cooling water feeding pipe, said filter body having upstream and downstream filter surfaces as seen in a given flow direction through the cooling water feeding pipe, radial ridges projecting from said upstream surface against said given flow direction forming chambers with said upstream surface and sub-dividing said upstream surface into individual sectors each having a given central angle and a two-dimensionally domed shape, said radial ridges having free edges, a rotatable suction device coaxial with said filter body, means for rotating said suction device for partially acting upon and completely successively sweeping said upstream filter surface, said suction device having a sector-shaped nozzle with a central angle substantially equal to said given central angle, said nozzle having edges circulating at a distance from said free edges of said radial ridges defining a gap therebetween, and flexible sealing lips attached to said free edges of said radial ridges and being at least as wide as said gap and bridging said gap.

2. Device according to claim 1, including a circulating ring disposed radially outwardly of said radial ridges, said ring uniting said radial ridges and defining sectors forming individual filter baskets with said radial ridges.

3. Device according to claim 1, including a circulating ring having an inner periphery disposed outside said filter body, said filter body being formed of arched segments projecting substantially radially and horizontally from a central axis and extending substantially tangentially up to said inner periphery of said circulating ring.

4. Device according to claim 3, including plates being fixed to said radial ridges above and below said arched segments for bracing said arched segments, said plates having a contour at a bracing point corresponding to the contour of said filter body.

5. Device according to claim 4, wherein at least one of said arched segments is in the form of an excess pressure flap having a radial extension and an outer edge, and including means for swiveling said excess pressure flap in said given flow direction across an axis disposed at an angle relative to said radial extension of said excess pressure flap in the vicinity of said outer edge of said excess pressure flap.

6. Device according to claim 5, wherein said radial ridges have walls with means defining overflow orifices formed therein for water at excess pressure, on both sides of said excess pressure flap.

7. Device according to claim 3, wherein at least one of said arched segments is in the form of an excess pressure flap having a radial extension and an outer edge, and including means for swiveling said excess pressure flap in said given flow direction across an axis disposed at an angle relative to said radial extension of said excess pressure flap in the vicinity of said outer edge of said excess pressure flap.

8. Device according to claim 7, wherein said radial ridges have walls with means defining overflow orifices formed therein for water at excess pressure, on both sides of said excess pressure flap.

9. Device according to claim 1, wherein said edges of said radial ridges project upstream and downstream according to conical generating lines, and said suction device and said rotating means are disposed completely within the cooling water feeding pipe.

10. Device according to claim 9, including a fixed part of a suction pipe line disposed axially-radially in a flanged pipe section upstream of the cooling water feeding pipe and feeding water through the cooling water feeding pipe.

11. Method for the mechanical cleansing of fluids in a cooling water feeding pipe with a device including:
a rotationally symmetric filter body disposed in and extending over the entire cross section of a cooling water feeding pipe, said filter having upstream and downstream filter surfaces as seen in a given flow direction through the cooling water feeding pipe, radial ridges projecting from said upstream surface against said given flow direction forming chambers with said upstream surface and sub-dividing said upstream surface into individual sectors each having a given central angle and a two-dimensionally domed shape, said radial ridges having free edges, a rotatable suction device coaxial with said filter body, means for rotating said suction device for partially acting upon and completely successively sweeping said upstream filter surface, said suction device having a sector-shaped nozzle with a central angle substantially equal to said given central angle, said nozzle having edges circulating at a distance from said free edges of said radial ridges defining a gap therebetween, and flexible sealing lips attached to said free edges of said radial ridges and being at least as wide as said gap and bridging said gap;
which comprises successively running the suction nozzle discontinuously against the individual sectors while liquid flows through the filter in the given flow direction, and holding the suction nozzle against a sector until a sufficient build-up of a back-flow and a suction of sediments has occurred.

* * * * *